United States Patent
Sato

(10) Patent No.: US 8,952,684 B2
(45) Date of Patent: Feb. 10, 2015

(54) MAGNETIC FORCE SENSOR SENSING MAGNETIC FLUX TO CALCULATE FORCES

(75) Inventor: Shuuichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 13/512,299

(22) PCT Filed: Dec. 8, 2010

(86) PCT No.: PCT/JP2010/007142
§ 371 (c)(1),
(2), (4) Date: May 25, 2012

(87) PCT Pub. No.: WO2011/074211
PCT Pub. Date: Jun. 23, 2011

(65) Prior Publication Data
US 2012/0274320 A1   Nov. 1, 2012

(30) Foreign Application Priority Data
Dec. 15, 2009   (JP) ................................ 2009-284567

(51) Int. Cl.
| G01B 7/14 | (2006.01) |
| G01L 1/14 | (2006.01) |
| G01L 5/16 | (2006.01) |

(52) U.S. Cl.
CPC .... G01L 1/14 (2013.01); G01L 5/16 (2013.01)
USPC ............... 324/207.24; 324/207.21; 324/207.2

(58) Field of Classification Search
CPC ................................... G01L 5/16; G01L 1/14
USPC ........ 324/207.2, 207.21, 207.24, 207.25, 174
See application file for complete search history.

(56) References Cited

U.S. PATENT DOCUMENTS

| 3,286,528 A | 11/1966 | Jullien-Davin |
| 4,982,613 A * | 1/1991 | Becker ..................... 73/862.625 |
| 7,388,574 B2 * | 6/2008 | Takatsuka et al. ............ 345/156 |
| 2006/0010992 A1 | 1/2006 | Shima |

FOREIGN PATENT DOCUMENTS

| CN | 85103183 A | 4/1987 |
| CN | 2241875 Y | 12/1996 |
| DE | 102007009389 A1 | 8/2008 |
| JP | 2000-214002 A | 8/2000 |
| JP | 2004-325328 A | 11/2004 |
| JP | 2005-321592 A | 11/2005 |
| JP | 2009-075083 A | 4/2009 |
| WO | 2008/101820 A1 | 8/2008 |
| WO | 2009/028355 A1 | 3/2009 |

OTHER PUBLICATIONS

U.S. Appl. No. 13/509,218, filed May 10, 2012, Shuuichi Sato.

* cited by examiner

Primary Examiner — Jay Patidar
(74) Attorney, Agent, or Firm — Canon USA Inc IP Division

(57) ABSTRACT

There is provided a magnetic force sensor including: an action unit elastically supported by a supporting member; a magnetic-flux generating source including two or more magnets which are disposed so that a polarity of each of the magnetic-pole faces of the magnets is opposite to a polarity of a corresponding one of the magnetic-pole faces of the adjacent magnets in a particular direction; first magnetoelectric transducers that are individually provided at positions, the positions being positions at which the first magnetoelectric transducers oppose the magnetic-pole faces of the magnets in the action unit; and a second magnetoelectric transducer provided between the first magnetoelectric transducers. Vertical-direction components of a force are detected on the basis of outputs of the first magnetoelectric transducers, and a horizontal-direction component of the force is detected on the basis of an output of the second magnetoelectric transducer.

8 Claims, 11 Drawing Sheets

--Prior Art--

--Prior Art--

MAGNETIC FORCE SENSOR SENSING MAGNETIC FLUX TO CALCULATE FORCES

TECHNICAL FIELD

The present invention relates to a magnetic force sensor for detecting changes in magnetic flux density that are generated by relative displacement between a magnetic-flux generating source and magnetoelectric transducers, and for converting the changes in magnetic flux density into force and moment components.

BACKGROUND ART

Force sensors are sensors that detect forces and moments acting along at most six axes in a three-dimensional coordinate space with an X axis, a Y axis, and a Z axis, which are forces Fx, Fy, and Fz acting in translation directions along the individual axes and moments Mx, My, and Mz acting in rotation directions along the individual axes. Such a force sensor is mounted in, for example, a wrist portion of an industrial robot hand. The force sensor can detect forces and moments that are generated in an assembly task to obtain detected values, and can modify an operation of the assembly task in accordance with the detected values. Regarding a detection principal of a force sensor, a sensor utilizing a magnetic detection method as described in PTL has been presented.

FIGS. 10A and 10B illustrate a configuration of an example of the related art described in PTL. An elastic member is provided so as to be connected to an action unit having a plate shape, and a magnetic-flux generating source 102 is embedded in the elastic member. Four magnetoelectric transducers 101 are disposed so as to oppose the magnetization directions of the magnetic-flux generating source 102. When a force is applied to the action unit, the magnetic-flux generating source 102 is displaced by elastic deformation of the elastic member. Changes in magnetic flux density that are generated by the displacement are detected by the magnetoelectric transducers 101. Accordingly, force components acting along three axis directions, i.e., the X-axis and Y-axis directions along which the magnetic-flux generating source 102 is displaced in the horizontal direction with respect to a plane including the magnetoelectric transducers 101 and the Z-axis direction along which the magnetic-flux generating source 102 is displaced in the vertical direction with respect to the plane, can be detected.

However, in a magnetic force sensor that is typified by the sensor described in PTL given above, a magnetic field that is generated in a region including positions of the magnetoelectric transducers 101 has gradients in both the horizontal and vertical directions. The magnetic field changes in accordance with a direction in which the action unit is displaced, and the changes in the magnetic field are detected utilizing the gradients of the magnetic field, thereby detecting forces. For this reason, in some cases, interference from the other axis components becomes a problem, in which outputs along a measurement target axis are influenced by outputs along the other axes.

For example, a problem of interference from the other axis components occurs, in which, regardless of reception of an external force resulting in displacement only in the horizontal direction, changes in outputs that should be generated in a case of displacement in the vertical direction also appear because of an influence of the gradients.

The present invention has been made in order to solve the above-described problems, and provides a magnetic force sensor that reduces interference from the other axis components which occurs between horizontal-direction components and vertical-direction components.

CITATION LIST

Patent Literature

PTL 1: Japanese Patent Laid-Open No. 2004-325328

SUMMARY OF INVENTION

In order to solve the above-described problems, the present invention provides a magnetic force sensor that detects a force by detecting magnetic flux density which changes in accordance with relative displacement between an action unit that has received the force and a magnetic-flux generating source. The action unit is displaceable by the force. The magnetic force sensor includes the following elements: the action unit elastically supported by a supporting member; the magnetic-flux generating source including two or more magnets which are disposed so that a polarity of each of the magnetic-pole faces of the magnets is opposite to a polarity of a corresponding one of the magnetic-pole faces of the adjacent magnets in a particular direction; first magnetoelectric transducers that are individually provided at positions, the positions being positions at which the first magnetoelectric transducers oppose the magnetic-pole faces of the two or more magnets; and a second magnetoelectric transducer that is provided between the first magnetoelectric transducers. Vertical-direction components of the force that the action unit has received are detected on the basis of outputs of the first magnetoelectric transducers, and a horizontal-direction component of the force that the action unit has received is detected on the basis of an output of the second magnetoelectric transducer.

In the magnetic force sensor according to the present invention, regarding the first magnetoelectric transducers that exist at the positions, the positions being positions at which the first magnetoelectric transducers oppose the magnetic-pole faces of the magnets, although the magnetic flux density of the vertical-direction components of the magnetic field changes by a large amount for the relative displacement between the first magnetoelectric transducers and the magnetic-flux generating source, the magnetic flux density of the horizontal-direction components changes by a small amount. In contrast, regarding the second magnetoelectric transducer that exists between the first magnetoelectric transducers, although the magnetic flux density of the horizontal-direction component of the magnetic field changes by a large amount for the relative displacement between the second magnetoelectric transducer and the magnetic-flux generating source, the magnetic flux density of the vertical-direction component changes by a small amount. The individual magnetoelectric transducers are disposed at the positions, and forces are detected, whereby interference from the other axis components which occurs between the horizontal-direction components and the vertical-direction components can be reduced.

DESCRIPTION OF EMBODIMENTS

Hereinafter, force sensors according to the present invention will be described with reference to the accompanying drawings. In order to prevent descriptions from becoming complicated, forces and moments are integrated into and referred to as a "force" in some cases.

Figure 1:
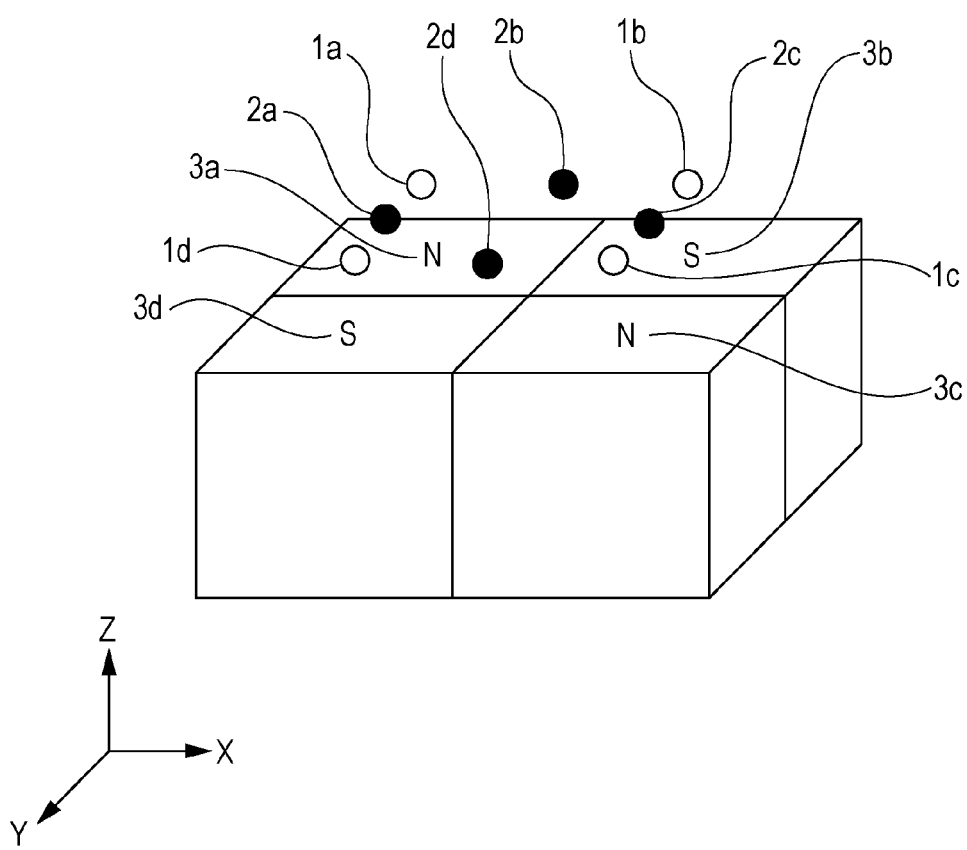
FIG. 1 is a diagram illustrating a configuration of a sensing unit according to the present invention.

FIG. 1 is a diagram that most clearly illustrates the features of the present embodiment, and is a perspective view of a sensing unit. In the present embodiment, a unit into which magnetoelectric transducers associated with sensing of a force and a magnetic-flux generating source are integrated is referred to as a "sensing unit". The sensing unit achieves a function of detecting forces and moments by detecting magnetic flux density that changes in accordance with relative displacement between an action unit 4 and the magnetic-flux generating source, which are described below, and by converting changes in the detected magnetic flux density into electric signals. Reference numerals 1a to 1d denote first magnetoelectric transducers that are disposed so as to oppose magnetic-pole faces of magnets, and, hereinafter, when it is not necessary to distinguish the first magnetoelectric transducers from one another, the first magnetoelectric transducers 1a to 1d are collectively referred to as "first magnetoelectric transducers 1". Reference numerals 2a to 2d denote second magnetoelectric transducers that are disposed between the first magnetoelectric transducers, and, hereinafter, when it is not necessary to distinguish the second magnetoelectric transducers from one another, the second magnetoelectric transducers 2a to 2d are collectively referred to as "second magnetoelectric transducers 2". Reference numerals 3a to 3d denote four magnets included in the magnetic-flux generating source. The magnets 3a to 3d are disposed so that the polarity of each S or N pole of the magnets 3a to 3d is opposite to the polarity of a corresponding one of the poles of the adjacent magnets in the Z-axis direction.

It is only necessary that the magnetic-flux generating source include two or more magnets which are disposed so that the polarity of each of the magnetic-pole faces of the magnets is opposite to the polarity of a corresponding one of the magnetic-pole faces of the adjacent magnets in a particular direction. The number of magnets included in the magnetic-flux generating source does not necessarily need to be four. Additionally, the number of sensing units does not necessarily need to be one, and a plurality of sensing units may be provided in one sensor.

Furthermore, the number of magnetoelectric transducers that are disposed does not necessarily need to be the number of magnetoelectric transducers in the above-described case. A user of the force sensor according to the invention of the subject application may appropriately select the number of magnetoelectric transducers in accordance with a desired accuracy or the like.

Figure 2:
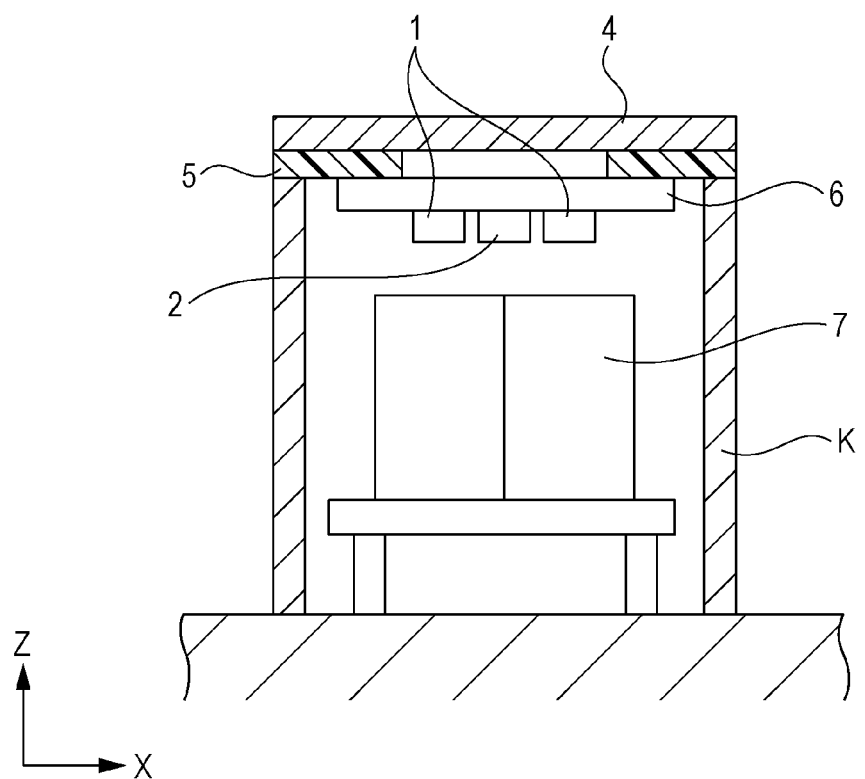
FIG. 2 is a diagram illustrating a cross-sectional configuration of a magnetic force sensor according to the present invention.

FIG. 2 is a cross-sectional view of a magnetic force sensor having the sensing unit illustrated in FIG. 1, which is taken along the X and Z axes. The sensing unit is stored inside a housing K having a tubular shape.

Reference numeral 4 denotes an action unit on which a force that is applied from the outside acts. Reference numeral 5 denotes an elastic member that converts the force, which acts on the action unit 4, into a displacement. Reference numeral 6 denotes a substrate on which the first and second magnetoelectric transducers 1 and 2 are mounted. Reference numeral 7 denotes a magnetic-flux generating source including a plurality of magnets. The first and second magnetoelectric transducers 1 and 2, which are mounted on the substrate 6, are fixed to the action unit 4. Furthermore, the action unit 4 is elastically supported via the elastic member 5 by the housing K, which is a supporting member, so as to be displaceable. Moreover, the supporting member does not necessarily need to be a housing, and is not particularly limited if the supporting member is anything that can support an action unit via an elastic member such as a plate member.

The magnetic-flux generating source 7 includes two or more magnets 3, each of which has a pair of an N pole and an S pole. The magnetic-flux generating source 7 may be formed so as to have a pattern in which a plurality of magnets are connected to each other in one magnetic-flux generating source. In other words, it is only necessary that the magnetic-flux generating source be configured so that, at a boundary between adjacent magnets, the direction of a magnetic field which is generated from the magnets is reversed.

Furthermore, the magnets 3 and the magnetic-flux generating source 7 may be permanent magnets that are typified by ND-Fe—B magnets, Sm—Co magnets, Sm—Fe—N magnets, and ferrite magnets, or may be electromagnets each of which generates a magnetic force by energizing a coil that is wound around a magnetic body. The first and second magnetoelectric transducers 1 and 2 may be Hall elements, MR elements, magnetic impedance elements, fluxgate elements, wound coils, or the like.

When the action unit 4 receives a force Fx acting in the X-axis direction, a force Fy acting in the Y-axis direction, and a moment Mz acting in the Z-axis direction, the first and second magnetoelectric transducers 1 and 2 are relatively displaced with respect to the magnetic-flux generating source 7 in the horizontal direction (in the X-Y plane). In contrast, the action unit 4 receives a moment Mx acting in the X-axis direction, a moment My acting in the Y-axis direction, and a force Fz acting in the Z-axis direction, the first and second magnetoelectric transducers 1 and 2 are relatively displaced in the vertical direction (in the Z-X or Z-Y plane). The first and second magnetoelectric transducers 1 and 2 detect changes in the magnetic flux density, which have been generated in accordance with the displacement, of magnetic fluxes that pass through the first and second magnetoelectric transducers 1 and 2, and convert the changes in the magnetic flux density into forces and moments.

First Embodiment

Figure 3:
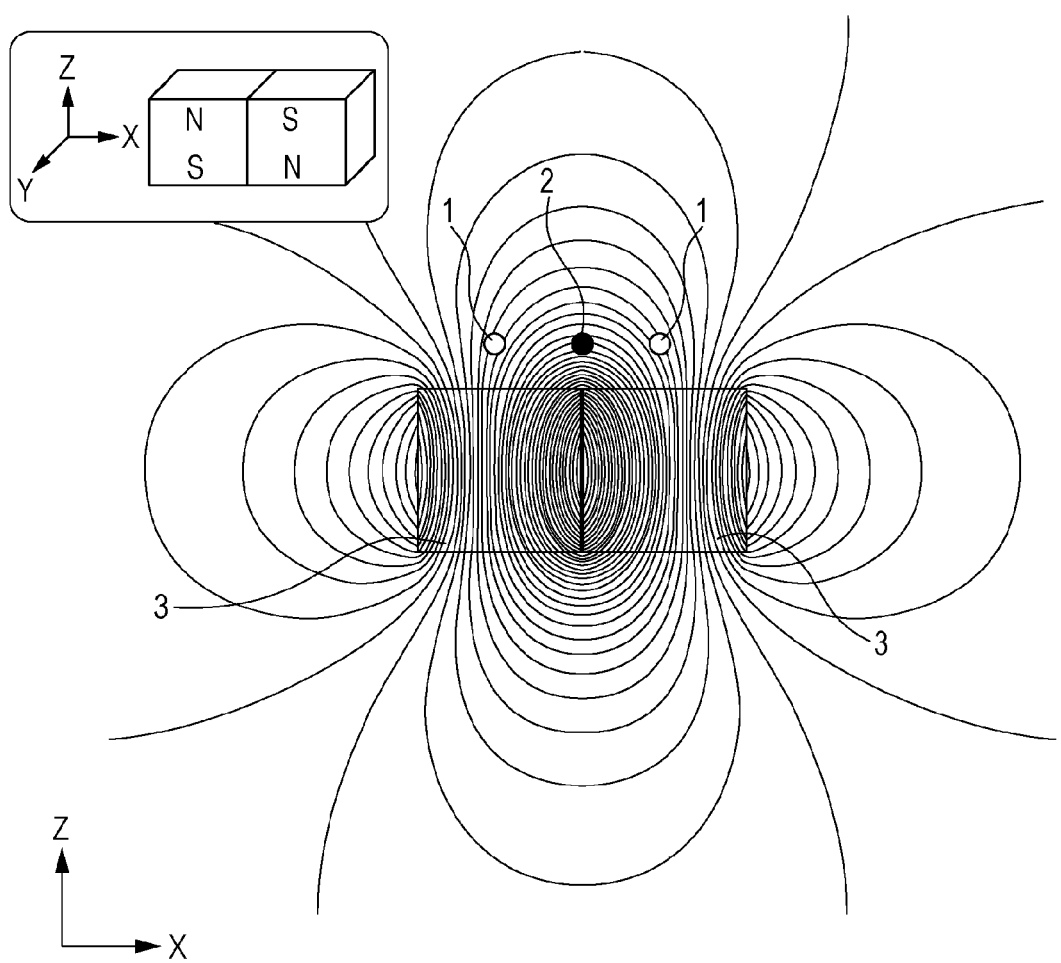
FIG. 3 is a diagram illustrating a result of simulation performed using two magnets.

FIG. 3 illustrates a result of a magnetic field simulation that was performed using a two-dimensional static magnetic field model. Referring to FIG. 2, two magnets 3 having a size of 5 mm in the Z-axis direction and 5 mm in the X-axis direction are disposed in the air. Furthermore, the polarities of the adjacent magnets 3 are opposite to each other with respect to the Z-axis direction. Here, characteristics of ND-Fe—B magnets having a residual magnetic flux density of about 1.4 T and a coercive force of about 1,000 kA/m are set as those of the magnets 3.

Figure 4A:
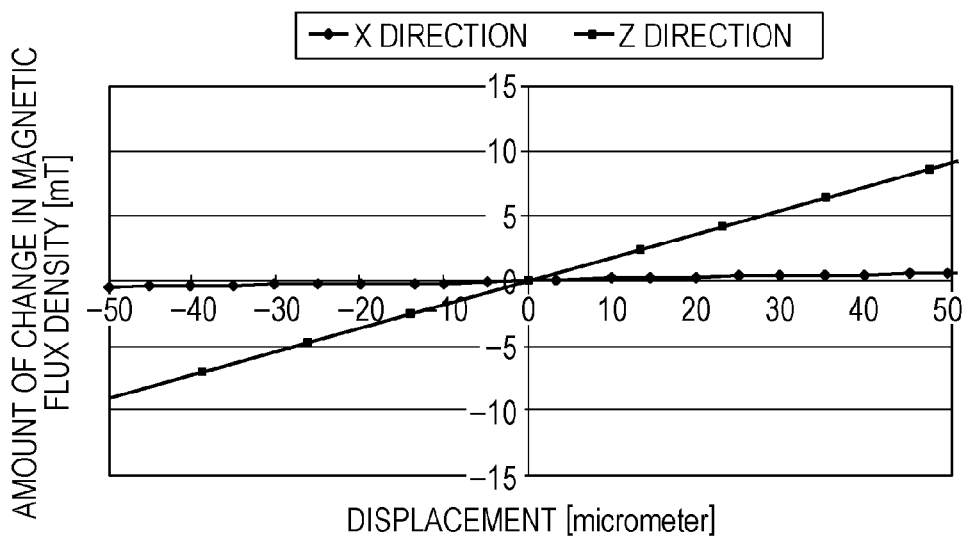
FIGS. 4A and 4B are graphs illustrating changes in magnetic flux density for displacements in the horizontal and vertical directions.

The first and second magnetoelectric transducers 1 and 2 are disposed so as to oppose the magnetic-pole faces of the magnets 3 so that the first and second magnetoelectric transducers 1 and 2 detect Z-axis-direction components of a magnetic field. When the first magnetoelectric transducers 1 which are disposed so as to oppose the centers of the magnetic-pole faces of the magnets 3 (which are disposed at positions that are 1 mm distant from the magnetic-pole faces in the Z-axis direction) are further displaced by plus or minus 50 micrometers in each of the Z-axis and X-axis directions, changes in the magnetic flux density of magnetic fluxes that pass through the first magnetoelectric transducers 1 are illustrated in FIG. 4A. The horizontal axis represents the displacement (micrometer), and the vertical axis represents the amount of change (mT) in the magnetic flux density.

Referring to FIG. 4A, although the magnetic flux density changes by a large amount for displacement of the first magnetoelectric transducers 1 in the Z-axis direction, the magnetic flux density changes by a small amount for displacement of the first magnetoelectric transducers 1 in the X-axis direction.

Figure 4B:
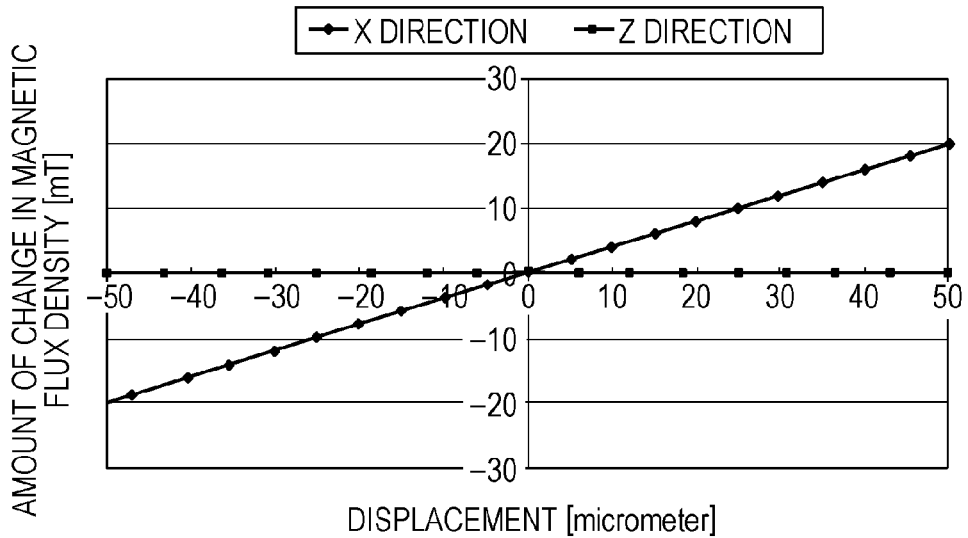

Next, when the second magnetoelectric transducer 2 which is disposed so as to oppose the boundary between the adjacent magnets 3 (which is disposed at a position that is 1 mm distant from the magnetic-pole faces in the Z-axis direction) is further displaced by plus or minus 50 micrometers in each of the Z-axis and X-axis directions, changes in the magnetic flux density of a magnetic flux that passes through the second magnetoelectric transducer 2 are illustrated in FIG. 4B. Referring to FIG. 4B, regarding the second magnetoelectric transducer 2, it is understandable that, although the magnetic flux density changes by a large amount for displacement of the second magnetoelectric transducer 2 in the X-axis direction, the magnetic flux density changes by a small amount for displacement of the second magnetoelectric transducer 2 in the Z-axis direction.

This can also be understood from the lines of magnetic flux illustrated in FIG. 3.

At positions of the first magnetoelectric transducers 1, the number of lines of magnetic flux that intersect the first magnetoelectric transducers 1 changes due to vertical displacement of the first magnetoelectric transducers 1. Accordingly, the magnetic flux density of the Z-axis-direction components of the magnetic field changes by a large amount.

In contrast, when the first magnetoelectric transducers 1 are horizontally displaced toward the end faces of the magnets, the gradients of the lines of magnetic flux change. Accordingly, the magnetic flux density decreases. However, because the number of lines of magnetic flux that intersect the first magnetoelectric transducers 1 increases as the first magnetoelectric transducers 1 approach the end portions of the magnets, the magnetic flux density increases. Thus, the total magnetic flux density of the Z-axis-direction components of the magnetic field changes by a small amount.

Next, at a position of the second magnetoelectric transducer 2, the gradients of the lines of magnetic flux are substantially parallel to the magnetic-pole faces. Accordingly, the magnetic flux density of the Z-axis-direction components of the magnetic field almost does not change due to vertical displacement of the second magnetoelectric transducer 2.

In contrast, the second magnetoelectric transducer 2 may be positioned in a region in which the direction of magnetic flux from an N pole to an S pole is reversed around the adjacent magnetic-pole faces. Because the direction of the magnetic flux sharply changes, the magnetic flux density of the Z-axis-direction components of the magnetic field also changes by a large amount due to horizontal displacement of the second magnetoelectric transducer 2.

From the above-described result, it is understandable that the characteristics of the first magnetoelectric transducers 1 which are disposed so as to oppose the centers of the magnetic-pole faces of the magnets 3 are opposite to those of the second magnetoelectric transducers 2 which are disposed so as to oppose the boundary between the adjacent magnets 3. Utilizing the characteristics, when the first magnetoelectric transducers 1 are used for detection of vertical-direction force components and the second magnetoelectric transducers 2 are used for detection of horizontal-direction force components, interference from the other axis components which occurs between the horizontal-direction force components and the vertical-direction force components can be reduced.

Effect Using Positions Associated with Disposition

In the example of the related art disclosed in PTL, the same magnetoelectric transducer needs to be used for detection of horizontal-direction components and vertical-direction components. For this reason, unless sensitivity with which the horizontal-direction components are detected and sensitivity with which the vertical-direction components are detected are the same, either one of the sensitivities is sacrificed. For this reason, in the example of the related art, it is desired that the amount of change in the magnetic flux density for the amount of displacement in the horizontal direction be the same as the amount of change in the magnetic flux density for the amount of displacement in the vertical direction. Regarding an effect of the present invention, a range in which the effect can be achieved will be verified using Equation (the amount of change in the magnetic flux density for displacement in the horizontal direction)/(the amount of change in the magnetic flux density for displacement in the vertical direction)=1 as a reference.

The first and second magnetoelectric transducers 1 and 2 are disposed at positions which are 1 mm distant from the magnetic-pole faces in the Z-axis direction, and which are 0.5, 1.0, 1.5, 2.0, 3.0, 3.5, 4.0, and 4.5 mm distant from the boundary between the magnets 3 in the X-axis direction. In a case in which the first and second magnetoelectric transducers 1 and 2 are displaced by plus or minus 50 micrometers in each of the Z-axis direction, which is the vertical direction, and the X-axis direction, which is the horizontal direction, data regarding changes in the magnetic flux density is acquired from the result of simulation illustrated in FIG. 3.

Figure 6:
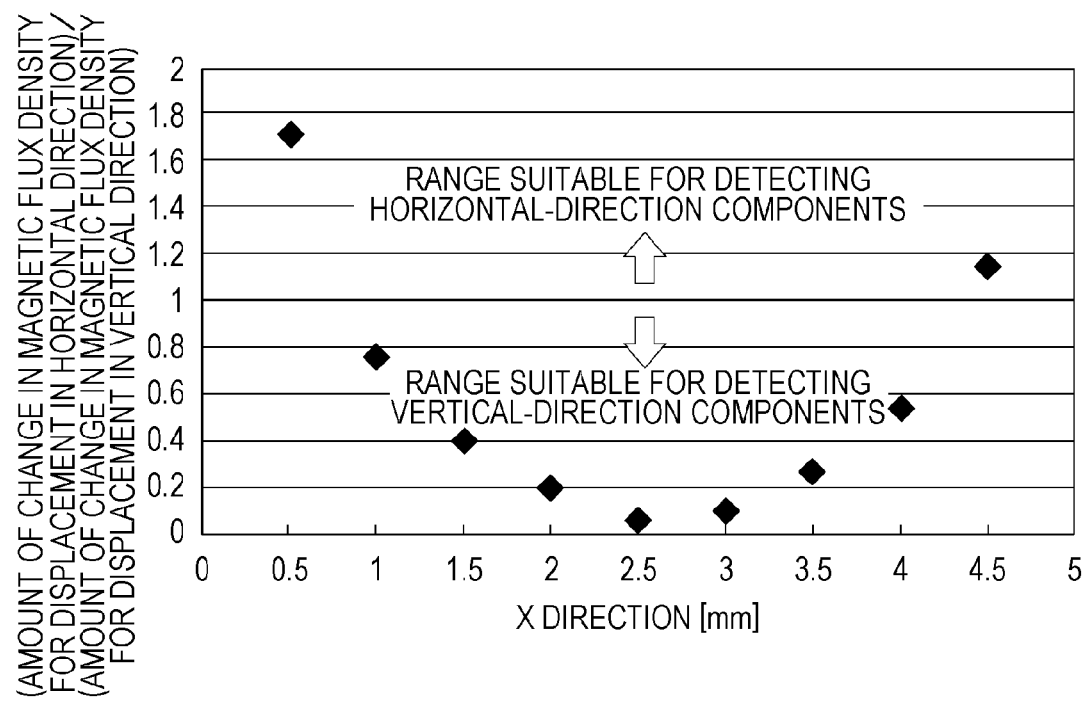
FIG. 6 is a graph illustrating the relationships between amounts of the changes in the magnetic flux density in the horizontal and vertical directions.

FIG. 6 illustrates a result of plotting Equation (the amount of change in the magnetic flux density for displacement in the horizontal direction)/(the amount of change in the magnetic flux density for displacement in the vertical direction) using the data. Note that the position which is illustrated in FIG. 6 and which is 0 mm distant in the X-axis direction corresponds to the disposition that is described with reference to FIG. 4B, and the position which is illustrated in FIG. 6 and which is 2.5 mm distant in the X-axis direction corresponds to the disposition that is described with reference to FIG. 4A.

When a value exceeds one, the value indicates that the amount of change in the magnetic flux density for displacement in the horizontal direction is larger than the amount of change in the magnetic flux density for displacement in the vertical direction. In contrast, when a value is smaller than one, the value indicates that the amount of change in the magnetic flux density for displacement in the vertical direction is larger than the amount of change in the magnetic flux density for displacement in the horizontal direction. Accordingly, regarding individual magnetoelectric transducers, magnetoelectric transducers that detect horizontal-direction components of the magnetic field can be disposed in a region including values that are equal to or larger than one, and magnetoelectric transducers that detect vertical-direction components of the magnetic field can be disposed in a region including values that are equal to or smaller than one.

Additionally, the closer to positions at which the first magnetoelectric transducers oppose the centers of the magnetic-pole faces of the magnets the first magnetoelectric transducers are located and the closer to a position at which the second magnetoelectric transducer opposes the boundary between the adjacent magnets the second magnetoelectric transducer is located, the higher the degree of the effect of the present invention can be obtained.

Second Embodiment

Furthermore, detection of horizontal-direction force components and detection of vertical-direction force components that are illustrated in the first embodiment may be swapped by disposing the magnetoelectric transducers so that the magnetoelectric transducers detect X-axis-direction components of the magnetic field. Hereinafter, such disposition of the magnetoelectric transducers will be described using FIG. 3, and FIGS. 5A and 5B.

Figure 5A:
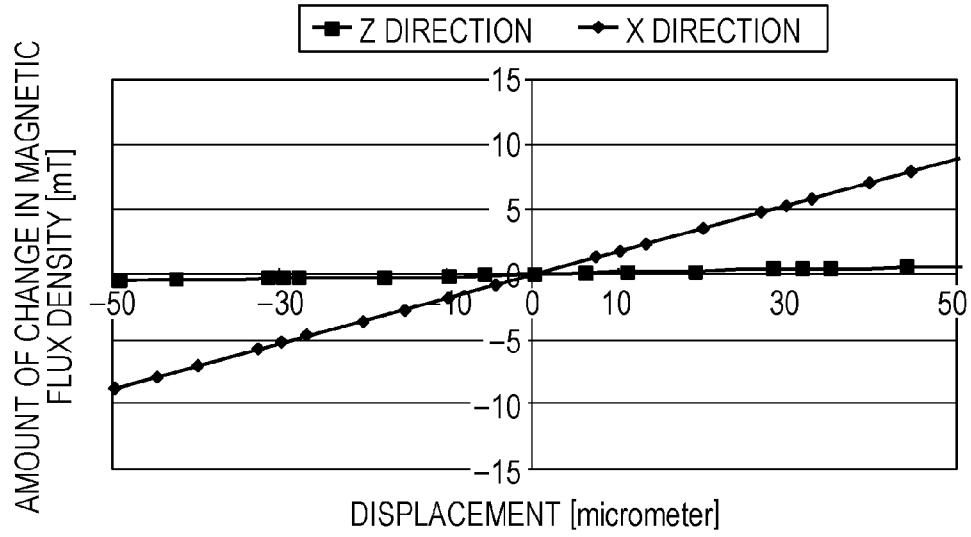
FIGS. 5A and 5B are graphs illustrating changes in magnetic flux density for displacements in the horizontal and vertical directions.

The first and second magnetoelectric transducers 1 and 2 are disposed so as to oppose unit magnets 3 so that the first and second magnetoelectric transducers 1 and 2 detect X-axis-direction components of a magnetic field. In the vicinity of the first magnetoelectric transducers 1 which are disposed so as to oppose the centers of the magnetic-pole faces of the unit magnets 3 (at positions that are 1 mm distant from the magnetic-pole faces in the Z-axis direction), when the first magnetoelectric transducers 1 are displaced by plus or minus 50 micrometers in each of the Z-axis and X-axis directions, changes in magnetic flux density are illustrated in FIG. 5A. Although the magnetic flux density changes by a large amount for displacement of the first magnetoelectric transducers 1 in the X-axis direction, the magnetic flux density changes by a small amount for displacement of the first magnetoelectric transducers 1 in the Z-axis direction.

Figure 5B:
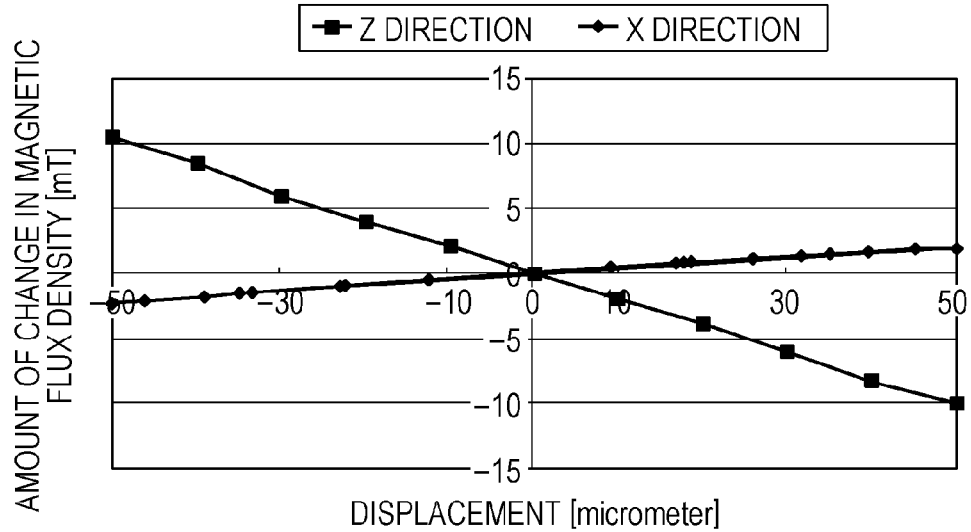

In the vicinity of the second magnetoelectric transducer 2 which is disposed so as to oppose the boundary between the adjacent unit magnets 3 (at a position that is 1 mm distant from the magnetic-pole faces in the Z-axis direction), when the second magnetoelectric transducer 2 is displaced by plus or minus 50 micrometers in each of the Z-axis and X-axis directions, changes in the magnetic flux density illustrated in FIG. 5B. Although the magnetic flux density changes by a large amount for displacement in the Z-axis direction, the magnetic flux density changes by a small amount for displacement in the X-axis direction.

This can also be understood from the lines of magnetic flux illustrated in FIG. 3.

At a position of the second magnetoelectric transducer 2, the number of lines of magnetic flux that intersect the second magnetoelectric transducer 2 changes due to vertical displacement of the second magnetoelectric transducer 2. Accordingly, the magnetic flux density of the X-axis-direction components of the magnetic field changes by a large amount.

In contrast, the gradients of the lines of magnetic flux change due to horizontal displacement of the second magnetoelectric transducer 2. Accordingly, the magnetic flux density of the X-axis-direction components of the magnetic field changes. However, the change in the magnetic flux density due to horizontal displacement is smaller than the change in the magnetic flux density due to vertical displacement.

At positions of the first magnetoelectric transducers 1, when the first magnetoelectric transducers 1 are horizontally displaced toward the end faces of the magnets, the gradients of the lines of magnetic flux change. Accordingly, the magnetic flux density increases. Because the number of lines of magnetic flux that intersect the first magnetoelectric transducers 1 increases, the magnetic flux density increases. Thus, the total magnetic flux density of the X-axis direction components of the magnetic field changes by a large amount.

In contrast, when the first magnetoelectric transducers 1 are vertically displaced toward the magnetic-pole faces, the gradients of the lines of magnetic flux change. Accordingly, the magnetic flux density decreases. However, because the number of lines of magnetic flux that intersect the first magnetoelectric transducers 1 increases, the magnetic flux density increases. Thus, the total magnetic flux density of the X-axis direction components of the magnetic field changes by a small amount.

As can been understood from the first and second embodiments described above, the magnetoelectric transducers that detect horizontal-direction force components and the magnetoelectric transducers that detect vertical-direction force components are individually disposed for the magnetic-flux generating source which is disposed so that the polarity of each of the magnetic-pole faces of the magnets is opposite to the polarity of a corresponding one of the magnetic-pole faces of the adjacent magnets. In this manner, interference from the other axis components which occurs between the horizontal-direction force components and the vertical-direction force components can be reduced.

Furthermore, when detection of vertical-direction components of the magnetic field with the magnetoelectric transducers is compared with detection of horizontal-direction components of the magnetic field with the magnetoelectric transducers, it is understandable that detection of vertical-direction components of the magnetic field with the magnetoelectric transducers is more favorable. The reason for this is that components for which changes are not cancelled out remain (for the first magnetoelectric transducers that detect horizontal-direction components of the magnetic field), and that sharpness of change from an N pole to an S pole can be utilized (for the second magnetoelectric transducers that detect vertical-direction components of the magnetic field). This result can also be understood from the results illustrated in FIGS. 4A and 4B and FIGS. 5A and 5B.

Third Embodiment

In the first embodiment, the configuration according to the present invention, in which interference from the other axis components that occurs between X-axis-direction components, which are horizontal-direction components, and Z-axis-direction components, which are vertical-direction components, can be reduced using a structure of the two adjacent magnets 3, is presented. A six-axis force sensor needs to be displaced not only in the X-axis and Z-axis directions but also in the Y-axis direction. However, because magnets having polarities opposite to each other are not disposed along the Y-axis direction, it is impossible to obtain an effect, which is the same as the effect obtained in the first embodiment, of reduction of interference from the other axis components. For this reason, the four magnets 3a to 3d are disposed as illustrated in FIG. 1, thereby providing a configuration in which adjacent magnets having polarities opposite to each other exist along all of the X-axis, Y-axis, and Z-axis directions.

Figure 7A:
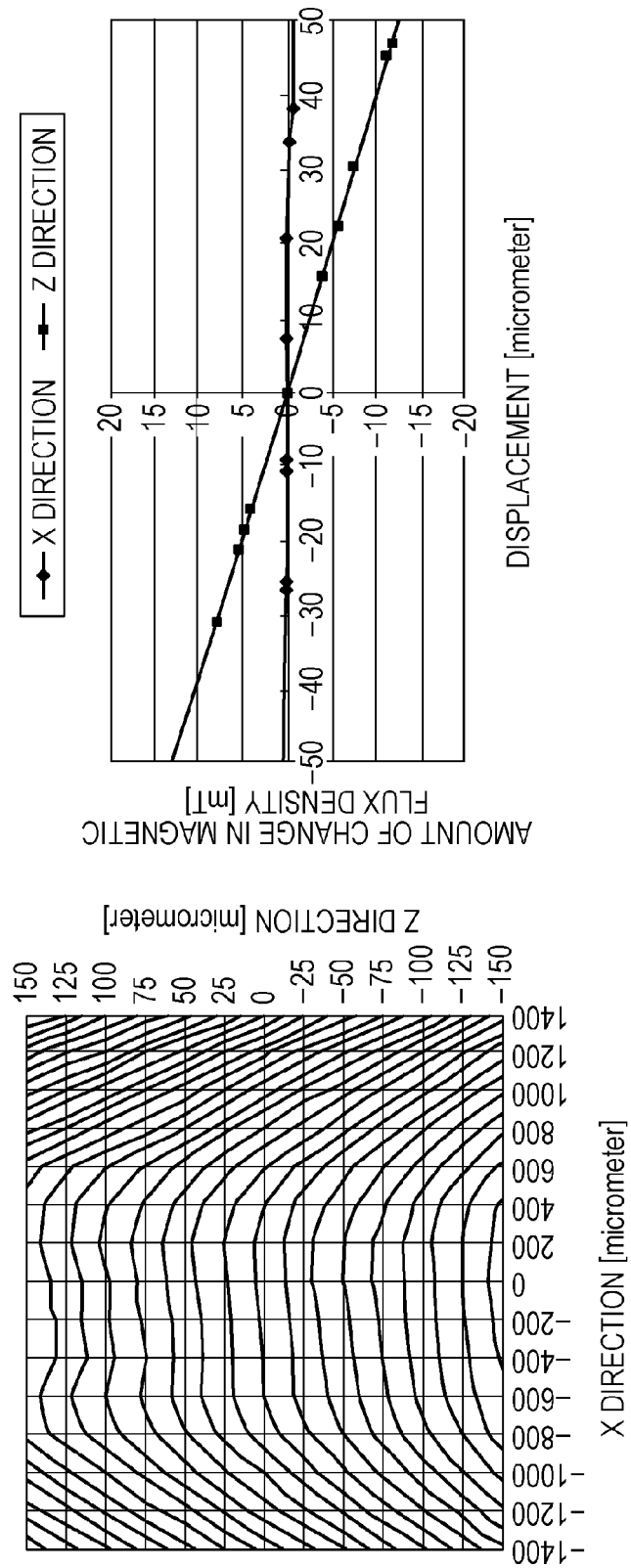
FIGS. 7A and 7B include graphs illustrating a result of simulation performed using magnets that are provided in a two-by-two matrix.
Figure 7B:
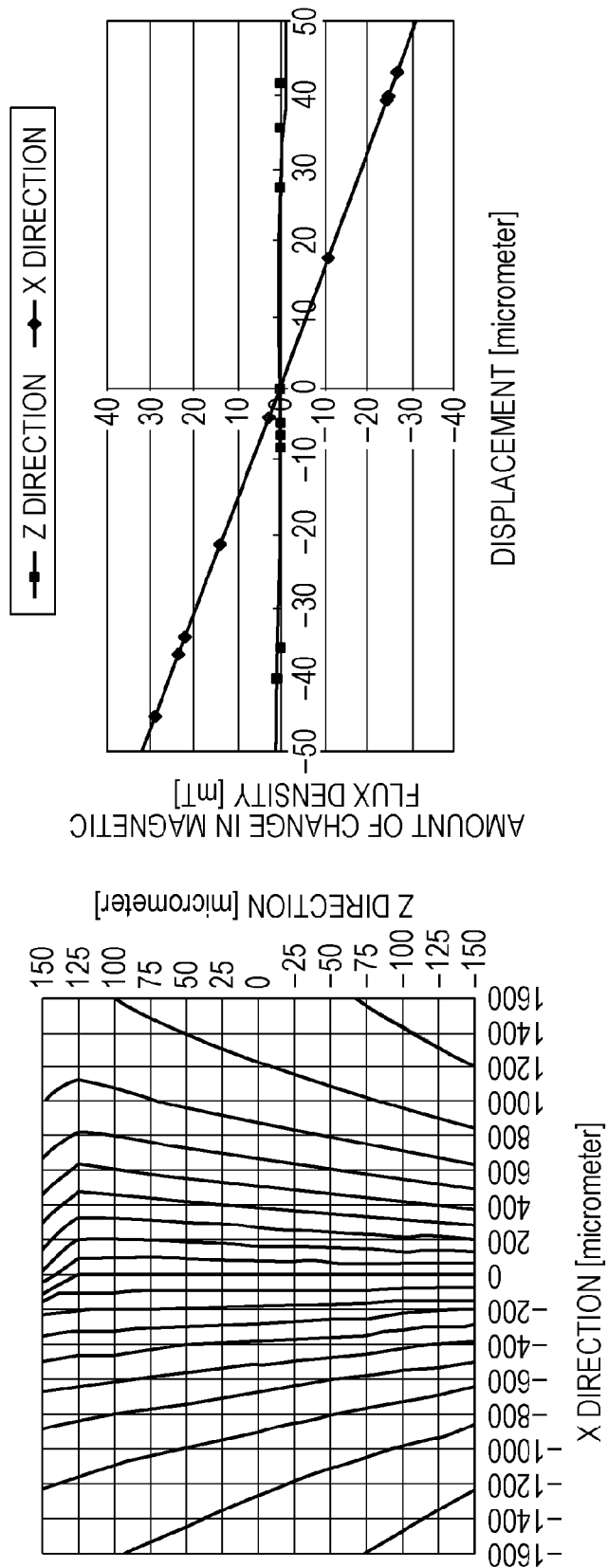

FIGS. 7A and 7B illustrate a result that is obtained by performing a magnetic field simulation using a three-dimensional static magnetic field model in a case in which the above-described four magnets 3a to 3d having the same shape are disposed. Referring to FIGS. 7A and 7B, the four magnets 3a to 3d having a size of 5 mm in the Z-axis direction, 5 mm in the X-axis direction, and 5 mm, which is a thickness, in the Y-axis direction are disposed in the air. Furthermore, the polarities of the adjacent magnets 3a to 3d are opposite to each other. Here, characteristics of ND-Fe—B magnets having a residual magnetic flux density of about 1.4 T and a coercive force of about 1,000 kA/m are set as those of the magnets 3a to 3d.

The eight magnetoelectric transducers, i.e., the first magnetoelectric transducers 1a to 1d and the second magnetoelectric transducers 2a to 2d, are disposed so as to oppose the magnets 3a to 3d so that the magnetoelectric transducers detect Z-axis-direction components of magnetic fluxes. FIG. 7A includes a graph illustrating the state of Z-axis-direction components of magnetic flux density in the vicinity of the first magnetoelectric transducer 1a that is disposed so as to oppose the center of a corresponding one of the magnetic-pole faces of the magnets 3a to 3d (at a position that is 0.7 mm distant from the magnetic-pole face in the Z-axis direction), and a graph illustrating changes in the magnetic flux density in a case in which the first magnetoelectric transducer 1a is displaced in each of the Z-axis and X-axis directions. Although the magnetic flux density changes by a large amount for displacement of the first magnetoelectric transducer 1a in the Z-axis direction, the magnetic flux density changes by a small amount for displacement of the first magnetoelectric transducer 1a in the X-axis direction.

Furthermore, the first magnetoelectric transducers 1b to 1d that are disposed so as to oppose the centers of the magnetic-pole faces of the magnets 3 have also characteristics that are similar to the above-described characteristics because of the symmetry of the generated magnetic field.

FIG. 7B includes a graph illustrating the state of Z-axis-direction components of the magnetic flux density in the vicinity of the second magnetoelectric transducer 2a that is disposed so as to oppose the boundary between corresponding magnets among the magnets 3a to 3d (at a position that is 0.7 mm distant from the magnetic-pole faces in the Z-axis direction), and a graph illustrating changes in the magnetic flux density in a case in which the second magnetoelectric transducer 2a is displaced in each of the Z-axis and X-axis directions. Although the magnetic flux density changes by a large amount for displacement of the second magnetoelectric transducer 2a in the X-axis direction, the magnetic flux density changes by a small amount for displacement of the second magnetoelectric transducer 2a in the Z-axis direction.

Furthermore, the second magnetoelectric transducers 2b to 2d that are disposed so as to oppose the boundaries between the magnets 3 have also characteristics that are similar to the above-described characteristics because of the symmetry of the generated magnetic field. Accordingly, it is understandable that interference from the other axis components can be reduced also in a case in which the magnets 3a to 3d are disposed in a two-by-two matrix.

As described above, an effect of reducing interference from the other axis components for displacements in all of the X-axis, Y-axis, and Z-axis directions can be obtained using the magnetic-flux generating source including magnets that are disposed in a two-by-two matrix.

Figure 8:
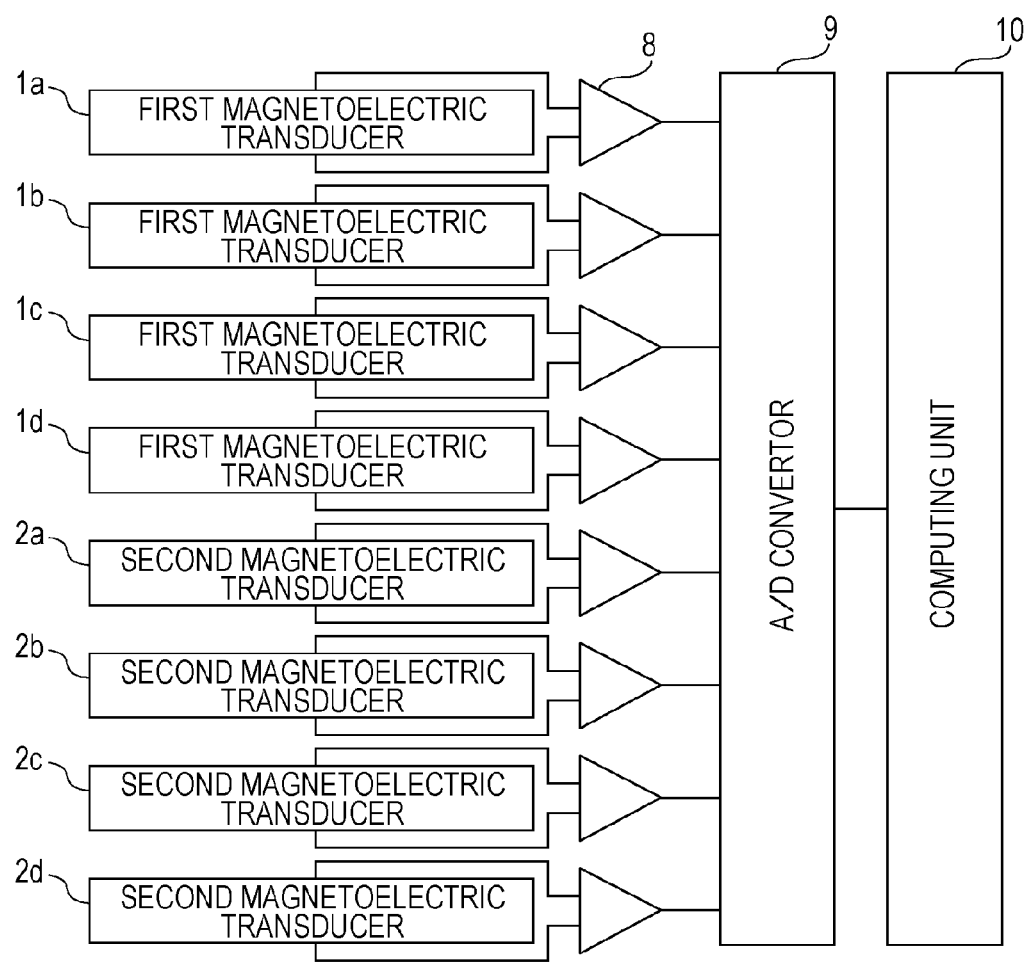
FIG. 8 is a diagram illustrating a flow of an output of the six-axis magnetic force sensor according to the present invention.

Next, a principle of detection of forces and moments along the six axes using the magnetic-flux generating source including the magnets 3a to 3d that are disposed in a two-by-two matrix will be described with reference to FIG. 8 that is a block diagram illustrating a flow of an output of the six-axis force sensor according to the present invention.

Detection of Vertical-Direction Components Fz, Mx, and My

In order to calculate vertical-direction components Fz, Mx, and My, vertical-direction components of the magnetic field that are detected by the first magnetoelectric transducers 1a to 1d which are disposed so as to oppose the centers of the magnetic-pole faces of the magnets are used. A change in the output of the first magnetoelectric transducer 1a that is generated by displacement of the first magnetoelectric transducer 1a is amplified by a signal amplifier 8, and is detected as V1a using a converter 9 such as an analog-to-digital (A/D) converter. Similarly, also regarding the first magnetoelectric transducers 1b to 1d, V1b to V1d are detected.

$Fz = V1a + V1b + V1c + V1d$ $Mx = (V1a + V1b) - (V1c + V1d)$ $My = (V1b + V1c) - (V1a + V1d)$

Fz, Mx, and My are calculated by a computing unit 10 as described above. Fz can be calculated using the sum of the amounts of changes in the outputs of the four magnetoelectric transducers. Mx can be calculated using the amounts of changes in the outputs of two pairs of the magnetoelectric transducers that are disposed in parallel to the X-axis direction. My can be calculated using the amounts of changes in the outputs of two pairs of the magnetoelectric transducers that are disposed parallel to the Y-axis direction.

Detection of Horizontal-Direction Components Fx, Fy, and Mz

In order to calculate horizontal-direction components Fx, Fy, and Mz, horizontal-direction components of the magnetic field that are detected by the second magnetoelectric transducers 2a to 2d, each of which is disposed between corresponding first magnetoelectric transducers among the first magnetoelectric transducers 1a to 1d, are used. A change in the output of the second magnetoelectric transducer 2a that is generated by displacement of the second magnetoelectric transducer 2a is amplified by the signal amplifier 8, and is detected as V2a using the converter 9 such as an A/D converter. Similarly, also regarding the second magnetoelectric transducers 2b to 2d, V2b to V2d are detected.

$Fx = V2b - V2d$ $Fy = V2a - V2c$ $Mz = V1a + V1b + V1c + V1d$

Fx, Fy, and Mz are calculated by the computing unit 10 as described above. Fx can be calculated using the amounts of changes in the outputs of two pairs of the magnetoelectric transducers that are disposed perpendicular to the X-axis direction. Fy can be calculated using the amounts of changes in the outputs of two pairs of the magnetoelectric transducers that are disposed perpendicular to the Y-axis direction. Mz can be calculated using the sum of the amounts of changes in the outputs of the four magnetoelectric transducers.

As described above, the four first magnetoelectric transducers that are individually disposed so as to oppose the magnetic-pole faces of the magnets that are disposed in a two-by-two matrix detect vertical-direction components, and the four second magnetoelectric transducers that are individually disposed between the first magnetoelectric transducers detect horizontal-direction components. Accordingly, a six-axis magnetic force sensor that reduces interference from the other axis components which occurs between the horizontal-direction components and the vertical-direction components can be provided.

Fourth Embodiment

The magnetic force sensor receives an external force, detects changes in the magnetic flux density that are generated by relative displacement between the magnetoelectric transducers and the magnetic-flux generating source, and calculates forces and moments. For this reason, in order to increase the sensitivity of the magnetic force sensor, the amount of relative displacement needs to be increased. In the magnetic force sensor, the action unit 4 serves as a point where a force is applied. The center of the elastic member 5 serves as a fulcrum. The first magnetoelectric transducers 1 and 2 serve as a point of application. The amount of displacement for an external force increases with the distance from the fulcrum to the point of application. When the distances between the elastic member 5 and the first and second magnetoelectric transducers 1 and 2 are increased, the sensitivity with which the moment components Mx, My, and Mz are detected can particularly be increased.

Figure 9A:
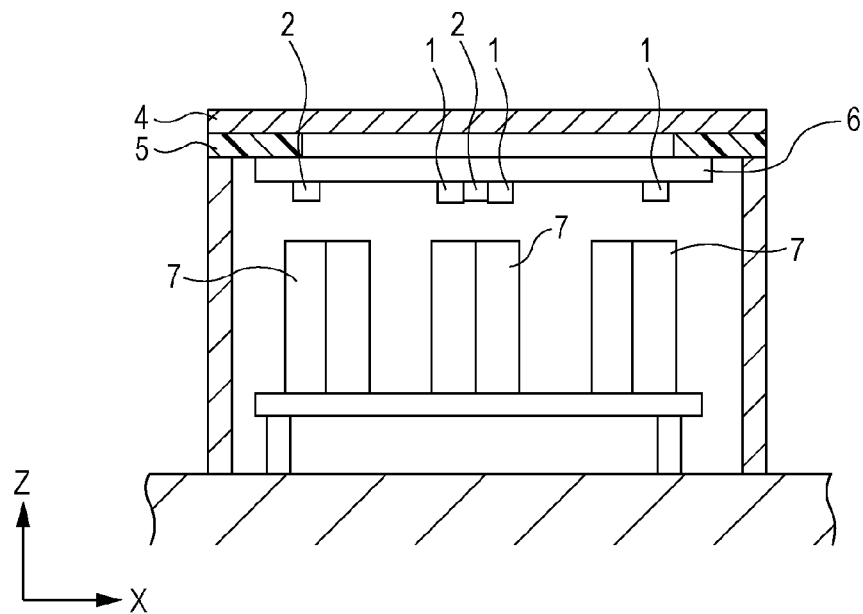
FIGS. 9A and 9B are diagrams illustrating a configuration in which a plurality of unit magnets provided in a two-by-two matrix are disposed.
Figure 9B:
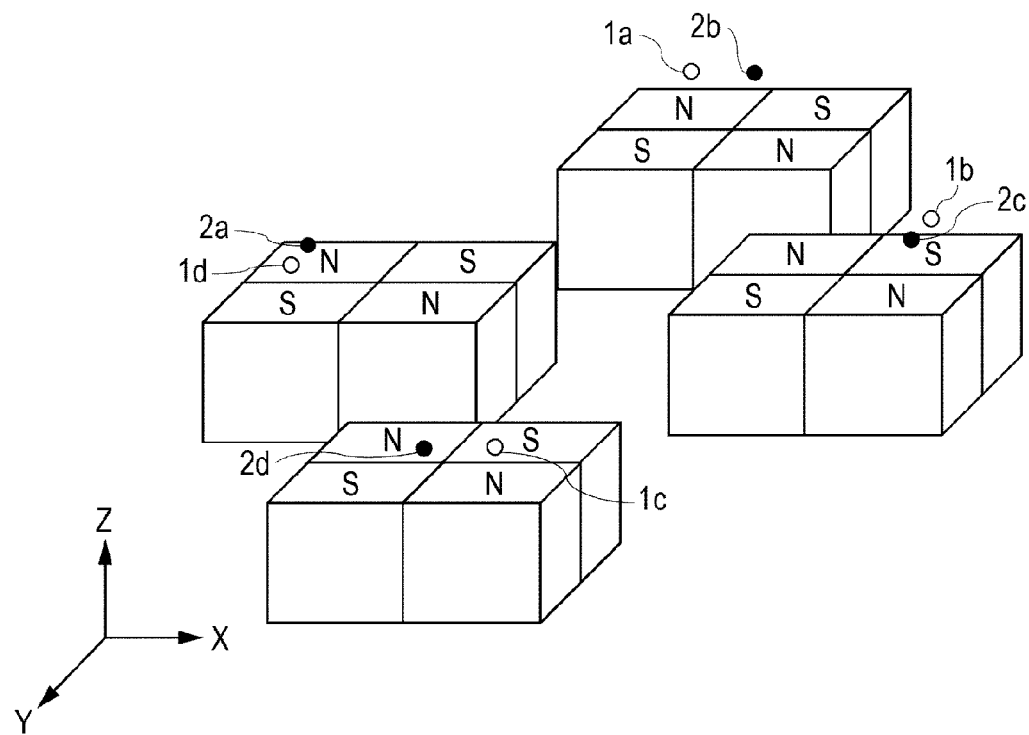
Figure 10A:
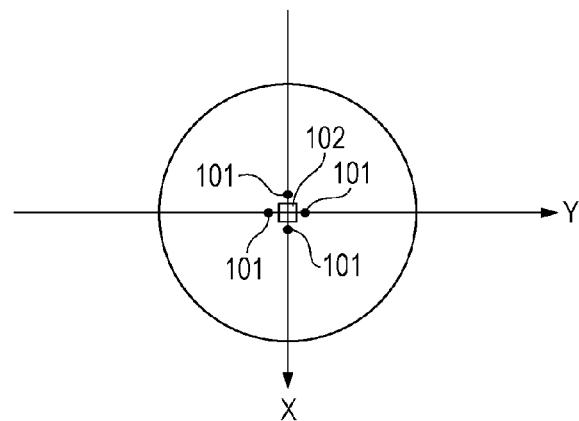
FIGS. 10A and 10B are diagrams illustrating a configuration of a force sensor of the related art.
Figure 10B:
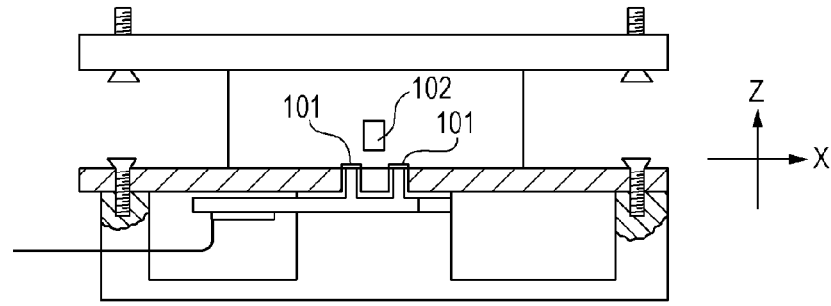

FIGS. 9A and 9B are diagrams in which four sets of unit magnets that are provided in a two-by-two matrix are disposed, and in which one first magnetoelectric transducer 1 and one second magnetoelectric transducer 2 are disposed above each of the sets of unit magnets that are provided in a two-by-two matrix. In order to increase the distances between the elastic member 5 and first and second magnetoelectric transducers 1 and 2, a method for increasing the size of the unit magnets can be used. However, when the method is used, the volume of the magnets increases and this leads to a disadvantage in cost and weight reduction. Accordingly, disposition of a plurality of sets is more advantageous. Furthermore, a calculation process for detecting components along the six axes is the same as the above-described method.

As described above, a high-sensitivity six-axis magnetic force sensor that reduces interference from the other axis components which occurs between horizontal-direction components and vertical-direction components can be provided.

Any of the magnetic force sensors according to the present invention can be mounted in, for example, a robot hand that requires to sense a force with precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-284567, filed Dec. 15, 2009, which is hereby incorporated by reference herein in its entirety.

The invention claimed is:

1. A force sensor that detects a force by detecting magnetic flux density which changes in accordance with relative displacement between an action unit that receives the force and a magnetic-flux generating source, the action unit being displaceable by the force, the force sensor comprising:
the action unit elastically supported by a supporting member;
the magnetic-flux generating source including two or more magnets which are disposed so that a polarity of each of the magnetic-pole faces of the magnets is opposite to a polarity of a corresponding one of the magnetic-pole faces of the adjacent magnets;
first magnetoelectric transducers that are individually provided at positions, the positions being positions at which the first magnetoelectric transducers oppose the magnetic-pole faces of the two or more magnets in the action unit; and
a second magnetoelectric transducer that is provided between the first magnetoelectric transducers,
wherein the force in a vertical direction is calculated by detecting a vertical-direction component of the magnetic flux density on the basis of outputs of the first magnetoelectric transducers, and the force in a horizontal direction is calculated by detecting a horizontal-direction component of the magnetic flux density on the basis of an output of the second magnetoelectric transducer.

2. The force sensor according to claim 1, wherein the second magnetoelectric transducer is provided at a position, the position being a position at which the second magnetoelectric transducer opposes a boundary between the adjacent magnets.

3. The force sensor according to claim 1, wherein the magnetic-flux generating source includes magnets that are provided in a two-by-two matrix.

4. The force sensor according to claim 3, wherein the first magnetoelectric transducers include four first magnetoelectric transducers that are individually disposed so as to oppose magnetic-pole faces of the magnets which are provided in a two-by-two matrix, and the second magnetoelectric transducer includes four second magnetoelectric transducers that are individually disposed between the first magnetoelectric transducers.

5. The force sensor according to claim 1, wherein the second magnetoelectric transducer includes second magnetoelectric transducers, and a plurality of groups of at least one of the first magnetoelectric transducers and at least one of the second magnetoelectric transducers are disposed in the action unit, and
wherein the magnetic-flux generating source includes magnetic-flux generating sources including magnets that are provided in a two-by-two matrix, and each of the magnetic-flux generating sources is disposed for a corresponding one of the plurality of groups of the first magnetoelectric transducers and the second magnetoelectric transducers.

6. A force sensor that detects a force by detecting magnetic flux density which changes in accordance with relative displacement between an action unit that receives the force and a magnetic-flux generating source, the action unit being displaceable by the force, the force sensor comprising:
the action unit elastically supported by a supporting member;
the magnetic-flux generating source including two or more magnets which are disposed so that a polarity of each of the magnetic-pole faces of the magnets is opposite to a polarity of a corresponding one of the magnetic-pole faces of the adjacent magnets;
first magnetoelectric transducers that are individually provided at positions, the positions being positions at which the first magnetoelectric transducers oppose the magnetic-pole faces of the two or more magnets in the action unit; and
a second magnetoelectric transducer that is provided between the first magnetoelectric transducers, wherein the force in a horizontal direction is calculated by detecting a horizontal-direction component of the magnetic flux density on the basis of outputs of the first magnetoelectric transducers, and the force in a vertical direction is calculated by detecting a vertical-direction component of the magnetic flux density on the basis of an output of the second magnetoelectric transducer.

7. A force sensor that detects a force by detecting magnetic flux density which changes in accordance with relative displacement between an action unit that receives the force and a plurality of magnetic-flux generating sources, the action unit being displaceable by the force, the force sensor comprising:
- the action unit elastically supported by a supporting member;
- the plurality of magnetic-flux generating sources each including a two-by-two matrix of unit magnets in which polarities of magnetic-pole faces of the unit magnets adjacent to each other are opposite to each other;
- a first magnetoelectric transducer that is provided at a position in the action unit, which opposes the magnetic-pole face of any one of the unit magnets included in each of the plurality of magnetic-flux generating sources; and
- a second magnetoelectric transducer that is provided at a position opposing a boundary between the unit magnet that the first magnetoelectric transducer opposes and one of the unit magnets adjacent thereto,
- wherein the force in a vertical direction is calculated by detecting a vertical-direction component of the magnetic flux density on the basis of an output of the first magnetoelectric transducer, and the force in a horizontal direction is calculated by detecting a horizontal-direction component of the magnetic flux density on the basis of an output of the second magnetoelectric transducer.

8. A force sensor that detects a force by detecting magnetic flux density that changes in accordance with relative displacement between an action unit that receives the force and a plurality of magnetic-flux generating sources, the action unit being displaceable by the force, the force sensor comprising:
- the action unit elastically supported by a supporting member;
- the plurality of magnetic-flux generating sources each including a two-by-two matrix of unit magnets in which polarities of magnetic-pole faces of the unit magnets adjacent to each other are opposite to each other;
- a first magnetoelectric transducer that is provided at a position in the action unit, which opposes the magnetic-pole face of any one of the unit magnets included in each of the plurality of magnetic-flux generating sources; and
- a second magnetoelectric transducer that is provided at a position opposing a boundary between the unit magnet that the first magnetoelectric transducer opposes and one of the unit magnets adjacent thereto,
- wherein the force in a horizontal direction is calculated by detecting a horizontal-direction component of the magnetic flux density on the basis of an output of the first magnetoelectric transducer, and the force in a vertical direction is calculated by detecting a vertical-direction component of the magnetic flux density on the basis of an output of the second magnetoelectric transducer.

* * * * *